(12) United States Patent
Arumugam et al.

(10) Patent No.: US 12,105,582 B2
(45) Date of Patent: Oct. 1, 2024

(54) SYSTEM FOR CODE BASE SHARING DURING COMPUTING APPLICATION FAILURE USING A DISTRIBUTED REGISTER NETWORK

(71) Applicant: BANK OF AMERICA CORPORATION, Charlotte, NC (US)

(72) Inventors: Rajalakshmi Arumugam, Tamil Nadu (IN); Mahesh Ganesan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 463 days.

(21) Appl. No.: 17/679,427

(22) Filed: Feb. 24, 2022

(65) Prior Publication Data

US 2023/0267034 A1   Aug. 24, 2023

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01); *G06F 11/0769* (2013.01)

(58) Field of Classification Search
CPC ............. G06F 11/0793; G06F 11/0721; G06F 11/0769; G06F 11/079; G06F 11/3006
See application file for complete search history.

(56) References Cited

U.S. PATENT DOCUMENTS

| | | |
|---|---|---|
| 7,454,759 B2 | 11/2008 | Mukundan et al. |
| 7,761,687 B2 | 7/2010 | Blumrich et al. |
| 8,069,204 B2 | 11/2011 | Reisman |
| 8,140,914 B2 | 3/2012 | Murphy et al. |
| 8,146,097 B2 | 3/2012 | Mukundan et al. |
| 8,320,235 B2 | 11/2012 | Volkerink et al. |
| 8,429,630 B2 | 4/2013 | Nickolov et al. |
| 8,473,468 B2 | 6/2013 | Pace et al. |
| 8,543,665 B2 | 9/2013 | Ansari et al. |
| 8,584,131 B2 | 11/2013 | Wong et al. |
| 9,110,711 B2 | 8/2015 | Abdelaziz et al. |
| 9,189,319 B2 | 11/2015 | Ito et al. |
| 9,547,726 B2 | 1/2017 | Ran et al. |
| 9,887,976 B2 | 2/2018 | Hughes et al. |
| 10,164,852 B2 | 12/2018 | Mueller et al. |

(Continued)

*Primary Examiner* — Katherine Lin
(74) *Attorney, Agent, or Firm* — Moore & Van Allen PLLC; Seongun M. Hong (57) ABSTRACT

A system is provided for code base sharing during computing application failure using a distributed register network. In particular, the system may comprise a plurality of computing application systems that are associated with one another and stored on a distributed register. In this regard, the distributed register may share a code base as well as processing logs for each application. The system may use a deep learning based machine learning process for identifying the dependencies, input data sources for each application, and expected data outputs. Accordingly, if an application experiences a failure, the payload of the failed application may be read and/or processed by another application to maintain the workflow. Furthermore, the system may use AI/ML processes to analyze the code base and/or system logs associated with application failures and generate recommendations for remediating failures.

20 Claims, 3 Drawing Sheets

(56) References Cited

U.S. PATENT DOCUMENTS

| | | |
|---|---|---|
| 10,210,487 B2 | 2/2019 | Penilla et al. |
| 10,230,587 B2 | 3/2019 | Cordray et al. |
| 10,331,522 B2 | 6/2019 | Allman et al. |
| 10,375,167 B2 | 8/2019 | Shamis et al. |
| 10,474,559 B2 | 11/2019 | Moorthi et al. |
| 10,552,242 B2 | 2/2020 | Purushothaman |
| 10,616,073 B1 | 4/2020 | Pierce |
| 10,635,561 B2 | 4/2020 | Obembe et al. |
| 10,678,629 B2 | 6/2020 | Purushothaman |
| 10,733,043 B2 | 8/2020 | Cmielowski et al. |
| 10,810,069 B2 | 10/2020 | Ghosh et al. |
| 10,831,579 B2 | 11/2020 | Liang et al. |
| 10,831,605 B2 | 11/2020 | Kulick et al. |
| 10,872,333 B2 | 12/2020 | Dua |
| 10,911,470 B2 | 2/2021 | Muddu et al. |
| 10,929,373 B2 | 2/2021 | Allman et al. |
| 2016/0182666 A1 | 6/2016 | Rathod |
| 2019/0356736 A1 | 11/2019 | Narayanaswamy et al. |
| 2020/0014598 A1 | 1/2020 | Lambeth et al. |
| 2021/0185573 A1 | 6/2021 | Crawford |
| 2022/0156053 A1* | 5/2022 | Shaastry ................. G06F 8/433 |

* cited by examiner

SYSTEM FOR CODE BASE SHARING DURING COMPUTING APPLICATION FAILURE USING A DISTRIBUTED REGISTER NETWORK

FIELD OF THE INVENTION

The present disclosure embraces a system for code base sharing during computing application failure using a distributed register network.

BACKGROUND

There is a need for an efficient and secure way to remediate failed processes and/or computing applications.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for code base sharing during computing application failure using a distributed register network. In particular, the system may comprise a plurality of computing application systems that are associated with one another and stored on a distributed register. In this regard, the distributed register may share a code base as well as processing logs for each application. The system may use a deep learning based machine learning process for identifying the dependencies, input data sources for each application, and expected data outputs. Accordingly, if an application experiences a failure, the payload of the failed application may be read and/or processed by another application to maintain the workflow. Furthermore, the system may use AI/ML processes to analyze the code base and/or system logs associated with application failures and generate recommendations for remediating failures.

Accordingly, embodiments of the present disclosure provide a system for code base sharing during computing application failure using a distributed register network, the system comprising a memory device with computer-readable program code stored thereon; a communication device; and a processing device operatively coupled to the memory device and the communication device, wherein the processing device is configured to execute the computer-readable program code to detect an application failure within a failed application stored on a distributed register; identify, using a deep learning based algorithm: 1) a dependency chain associated with the failed application, wherein the dependency chain comprises one or more dependent applications; 2) a source application associated with the failed application; and 3) an expected data output of the failed application; transfer, from a code base associated with the failed application, a payload associated with the failed application to a first dependent application; trigger an execution of the payload by the first dependent application; generate, using an artificial intelligence engine, one or more links between an error code associated with the failed application to one or more resolutions; and based on the one or more links, generate one or more recommendations for remediating the error code.

In some embodiments, triggering the execution of the payload comprises causing the first dependent application to retrieve input data from the source application; perform one or more processes on the input data based on the code base associated with the failed application; and transmit the expected data output of the failed application to a second dependent application based on the dependency chain associated with the failed application.

In some embodiments, triggering the execution of the payload comprises selecting the first dependent application based on computing resource availability of a host computing system associated with the first dependent application, wherein the computing resource availability comprises at least one of processing power, memory space, and network bandwidth.

In some embodiments, detecting the application failure comprises retrieving an error code within a system log associated with the failed application, wherein the system log is stored in the distributed register.

In some embodiments, the application failure comprises one of an operating system failure, processing failure, or data failure.

In some embodiments, the processing device is further configured to execute the computer-readable program code to automatically execute the one or more resolutions; detect that the one or more resolutions have remediated the error code; and append an indication of successful remediation to the distributed register.

In some embodiments, the processing device is further configured to execute the computer-readable program code to automatically execute the one or more resolutions; detect that the one or more resolutions have not remediated the error code; and append an indication of failed remediation to the distributed register.

Embodiments of the present disclosure also provide a computer program product for code base sharing during computing application failure using a distributed register network, the computer program product comprising at least one non-transitory computer readable medium having computer-readable program code portions embodied therein, the computer-readable program code portions comprising executable portions for detecting an application failure within a failed application stored on a distributed register; identifying, using a deep learning based algorithm: 1) a dependency chain associated with the failed application, wherein the dependency chain comprises one or more dependent applications; 2) a source application associated with the failed application; and 3) an expected data output of the failed application; transferring, from a code base associated with the failed application, a payload associated with the failed application to a first dependent application; triggering an execution of the payload by the first dependent application; generating, using an artificial intelligence engine, one or more links between an error code associated with the failed application to one or more resolutions; and based on the one or more links, generating one or more recommendations for remediating the error code.

In some embodiments, triggering the execution of the payload comprises causing the first dependent application to retrieve input data from the source application; perform one or more processes on the input data based on the code base associated with the failed application; and transmit the expected data output of the failed application to a second dependent application based on the dependency chain associated with the failed application.

In some embodiments, triggering the execution of the payload comprises selecting the first dependent application based on computing resource availability of a host computing system associated with the first dependent application, wherein the computing resource availability comprises at least one of processing power, memory space, and network bandwidth.

In some embodiments, detecting the application failure comprises retrieving an error code within a system log associated with the failed application, wherein the system log is stored in the distributed register.

In some embodiments, the application failure comprises one of an operating system failure, processing failure, or data failure.

In some embodiments, the computer-readable program code portions further comprise executable portions for automatically executing the one or more resolutions; detecting that the one or more resolutions have remediated the error code; and appending an indication of successful remediation to the distributed register.

Embodiments of the present disclosure also provide a computer-implemented method for code base sharing during computing application failure using a distributed register network, the computer-implemented method comprising detecting an application failure within a failed application stored on a distributed register; identifying, using a deep learning based algorithm: 1) a dependency chain associated with the failed application, wherein the dependency chain comprises one or more dependent applications; 2) a source application associated with the failed application; and 3) an expected data output of the failed application; transferring, from a code base associated with the failed application, a payload associated with the failed application to a first dependent application; triggering an execution of the payload by the first dependent application; generating, using an artificial intelligence engine, one or more links between an error code associated with the failed application to one or more resolutions; and based on the one or more links, generating one or more recommendations for remediating the error code.

In some embodiments, triggering the execution of the payload comprises causing the first dependent application to retrieve input data from the source application; perform one or more processes on the input data based on the code base associated with the failed application; and transmit the expected data output of the failed application to a second dependent application based on the dependency chain associated with the failed application.

In some embodiments, triggering the execution of the payload comprises selecting the first dependent application based on computing resource availability of a host computing system associated with the first dependent application, wherein the computing resource availability comprises at least one of processing power, memory space, and network bandwidth.

In some embodiments, detecting the application failure comprises retrieving an error code within a system log associated with the failed application, wherein the system log is stored in the distributed register.

In some embodiments, the application failure comprises one of an operating system failure, processing failure, or data failure.

In some embodiments, the computer-implemented method further comprises automatically executing the one or more resolutions; detecting that the one or more resolutions have remediated the error code; and appending an indication of successful remediation to the distributed register.

In some embodiments, the computer-implemented method further comprises automatically executing the one or more resolutions; detecting that the one or more resolutions have not remediated the error code; and appending an indication of failed remediation to the distributed register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

An enterprise network may comprise multiple computing applications that may be associated with and/or dependent on one another. For instance, application B may be dependent on certain outputs from application A (which may also be referred to herein as "affinity" between applications). Thus, if Application A experiences an error (e.g., operating system issues or incompatibilities, code or logical processing issues, data content or format issues, or the like), such an error may disrupt the workflow of Application B along with any other application depending therefrom.

Accordingly, the system may store the applications on a distributed register along with any code bases and/or system logs associated with such applications. "Code base" as used herein may refer to a collection of source code and/or libraries used to build the application. The system logs may contain information regarding application failures, such as error codes and/or error types (e.g., operating system failures, data type failures, processing failures, or the like). Using a deep learning-based artificial intelligence process to analyze the code base and/or system logs for each application, the system may identify the chain or tree of dependencies for the applications stored within the distributed register. In doing so, the system may identify all of the applications within the chain or tree, the expected input data sources for each application, the operations and/or functions of the application, and the expected outputs from each application. Subsequently, if an application experiences an error (where the application experiencing the error may be referred to herein as a "failed application"), another application (which may or may not be dependent on the failed application) may use the code base of the failed application to access the payload of the failed application and perform the necessary processes on the payload to continue the workflow.

An exemplary embodiment is described as follows for illustrative purposes. In one embodiment, Application X may transmit certain input data to Application A, which in turn processes the input data and provides outputs to Application B and Application C (i.e., Applications B and C are dependent on Application A). If Application A experiences a failure (e.g., Application A hangs or freezes, is experiencing network issues, has run out of storage space or computing resources, or the like), the system may attempt to resolve the issue by reading from the failure resolution database, which may comprise information regarding potential resolutions for application failures, and applying the fixes therein (e.g., updating software drivers). If the fix fails to remediate the issue or if no resolution to the issue is found, the deep learning processes of the system may identify the chain of dependencies (e.g., from Application X to Application A to Applications B and C). Based on the identified chain, the system may cause Application B and/or C to access the code base of Application A, retrieve the input data from Application X, and perform the processes of Application A on the input data from Application X. In this regard, the system may use a payload mobilizer system to transmit the transformations, functions, and/or code from the failed application's code base to another application for processing. In this way, the system is able to restore the workflows of processes that may be dependent on Application A.

In some embodiments, the system may perform processing load balancing of the failover processes. In this regard, the system may select the application that performs the failover based on availability of computing resources. For instance, if Application B is hosted and/or operated on a computing system with more available computing resources than Application C (e.g., the host system of Application B has a greater amount of storage space, a lower processing workload, or the like), the system may cause Application B (rather than Application C) to perform the failover of failed Application A.

In parallel to the workflow remediation process described above, the system may use another artificial intelligence and/or machine learning engine to create deep learning graph based links between error codes resulting from a failed application and one or more resolutions that may be relevant to such error codes. In this regard, the system may read the error codes from the system logs associated with the failed application, where the error codes may include various types of codes depending on the application. For instance, the failed application may in turn use various types of components (e.g., a Java frontend, SQL database, or the like), each of which may store different types of error codes in the system logs. The system may further read from code repositories and perform affinity detection with the history of failures across applications stored in the blockchain.

Based on the detected error codes, the system may use natural language processing-based algorithms to parse and analyze resources that may be relevant to said error codes. For instance, the system may search the Internet and access a knowledge repository, product support page, support forum post, or the like, which may have relevant information on remediating the error of the failed application. If one or more potential resolutions are detected, the system may generate one or more recommendations for resolving the error of the failed application based on the potential resolutions. In some embodiments, the system may automatically attempt to execute the one or more potential resolutions on the failed application (e.g., using a code fix applicator module). If the remediation is successful, the system may write an indication of successful remediation to the failed application's system log. In such an embodiment, the indication may include information regarding which of the one or more potential resolutions have been applied by the system. If the remediation is not successful, the system may write an indication of the failed remediation to the failed application's system log. In such an embodiment, the indication may include which of the one or more potential resolutions have been attempted by the system along with an indication that the one or more potential resolutions have failed to remediate the error. The system may further broadcast a notification to one or more computing systems, where the notification indicates that automated remediation of the failed error has failed.

The system as described herein confers a number of advantages over existing error resolution technologies. For instance, by storing the code base and system logs of dependent applications on the distributed register, workloads from failed applications may be efficiently redistributed to working applications within the dependency chain. Furthermore, by using intelligent machine learning-driven processes, the system may automatically identify and/or execute resolution steps on failed applications to remediate the failures.

Figure 1:
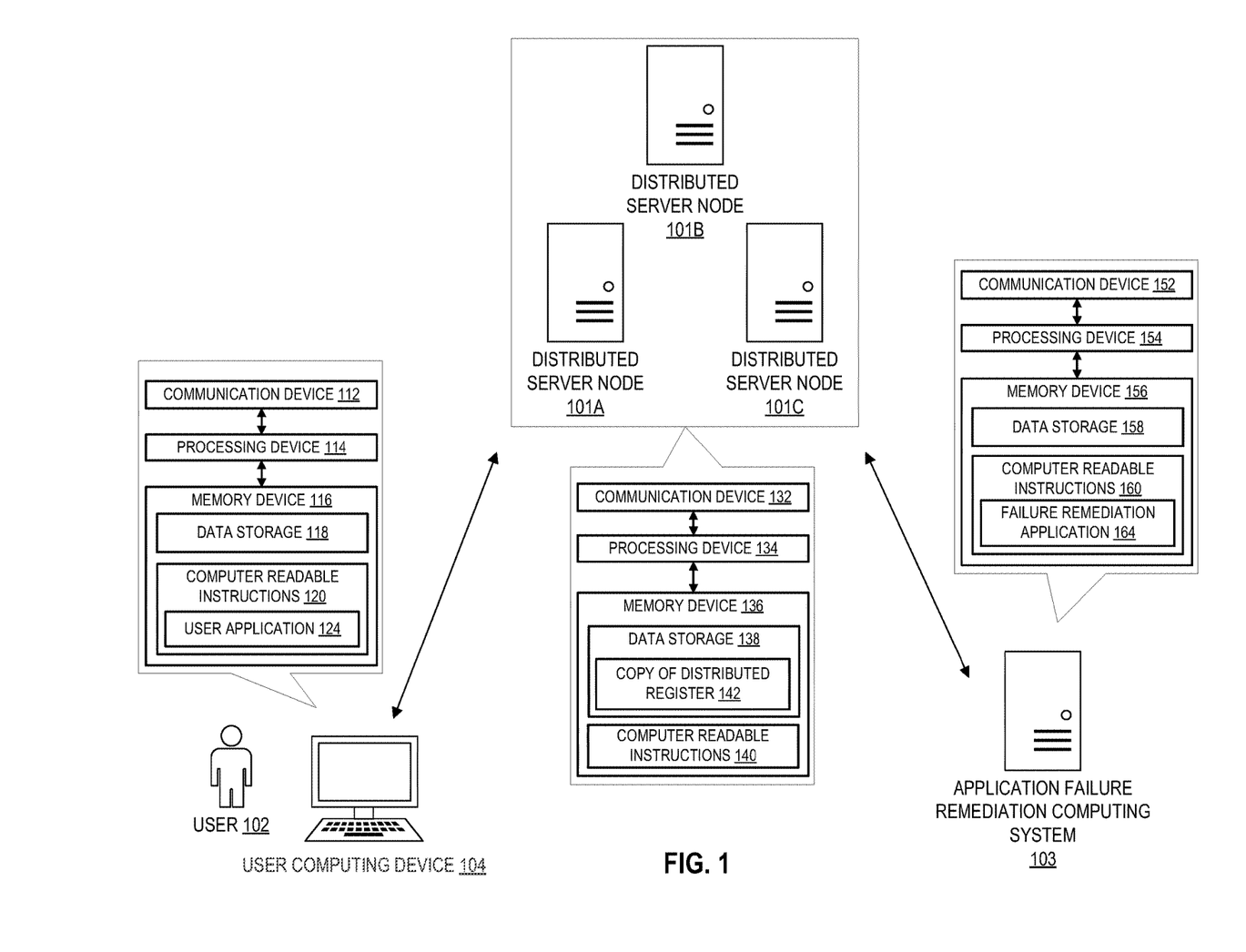
FIG. 1 illustrates an operating environment for the application failure remediation system, in accordance with one embodiment of the present disclosure.

Turning now to the figures, FIG. 1 illustrates an operating environment 100 for the application failure remediation system, in accordance with one embodiment of the present disclosure. In particular, FIG. 1 illustrates an application failure remediation computing system 103 and a user computing device 104 in operative communication with a plurality of distributed server nodes 101A, 101B, 101C over a network. In such a configuration, the computing systems within the network, including the application failure remediation computing system 103, the user computing device 104, and distributed server nodes 101A, 101B, 101C may transmit data to and/or receive data from one another through the network.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts three distributed server nodes 101A, 101B, 101C, the operating environment may comprise a greater or fewer number of distributed server nodes depending on the embodiment. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the distributed server nodes 101A, 101B, 101C may form a cluster of nodes that host a distributed register. Accordingly, the distributed server nodes 101A, 101B, 101C may each comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142), as described elsewhere herein, may comprise a series of data records relevant to the objectives of an entity associated with the distributed server network. In this regard, the distributed server nodes 101A, 101B, 101C may be able to read data from the distributed register, submit data records to the distributed register, participate in consensus mechanisms, or the like. In particular, the copy of the distributed register 142 may comprise one or more applications (which may be associated with one another, such as by dependency) along with the code bases and/or system logs associated with the one or more applications.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As illustrated in FIG. 1, the application failure remediation computing system 103 may be a computing system that coordinates the workflows of the applications stored on the copy of the distributed register 142. In this regard, the application failure remediation computing system 103 may be a server that is communicatively coupled with the distributed server nodes 101A, 101B, 101C. Accordingly, the application failure remediation computing system 103 may comprise a processing device 154 operatively coupled to a communication device 152 and a memory device 156. The memory device 156 may comprise data storage 158 and computer readable instructions 160 stored thereon, where the computer readable instructions 160 may comprise a failure remediation application 164.

The failure remediation application 164 may, when executed, cause the processing device 154 of the application failure remediation computing system 103 to perform the application remediation functions as described herein, such as coordinating payload mobilization, processing load balancing, and failover in response to application failure, as well as the machine learning-based processes of identification of application dependencies and linkages between error codes and potential resolutions. In this regard, the application failure remediation computing system 103 may further cause the processing device 154 to generate one or more recommendations for remediating application errors, apply one or more potential resolutions, submit data records to be appended to the distributed register (e.g., additions to application system logs regarding implementation of resolutions), and/or transmit notifications to one or more computing systems regarding the outcome of any resolution steps executed.

As illustrated in FIG. 1, the user computing device 104 may be in operative communication with the distributed server nodes 101A, 101B, 101C. The user computing device 104 may be a device that may be operated by a user (e.g., the user 102, who may be an employee or agent of the entity). In particular, the user computing device 104 may be a computing device which may be used access the copy of the distributed register 142 stored on the distributed server nodes 101A, 101B, and 101C and/or communicate with the application failure remediation computing system 103.

Accordingly, the user computing device 104 may comprise a communication device 112, a processing device 114, and a memory device 116. In some embodiments, the user computing device 104 may comprise hardware and/or software components that allow the user computing device 104 to interface with the user 102. In such embodiments, the user computing device 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing device 104 may further comprise data storage 118 and computer-readable instructions 120 stored thereon, where the computer-readable instructions 120 may comprise a user application 124. The user application 124 may be a software application that allows the user 102 to access a portal to view information regarding application failures (e.g., by viewing system logs) and potential resolution steps for resolving application failures. Accordingly, in some embodiments, the user application 124 may be an application provided by the entity and configured to access the distributed server nodes 101A, 101B, 101C. In other embodiments, the user application 124 may be a third party application such as a web browser, which may be used to access an entity server configured to provide selective access to the distributed server nodes 101A, 101B, 101C. In some embodiments, the user application 124 may further be configured to receive notifications from the application failure remediation computing system 103 regarding application failures that have been either successfully resolved or have not been successfully resolved by the remediation processes described herein.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

Figure 2:
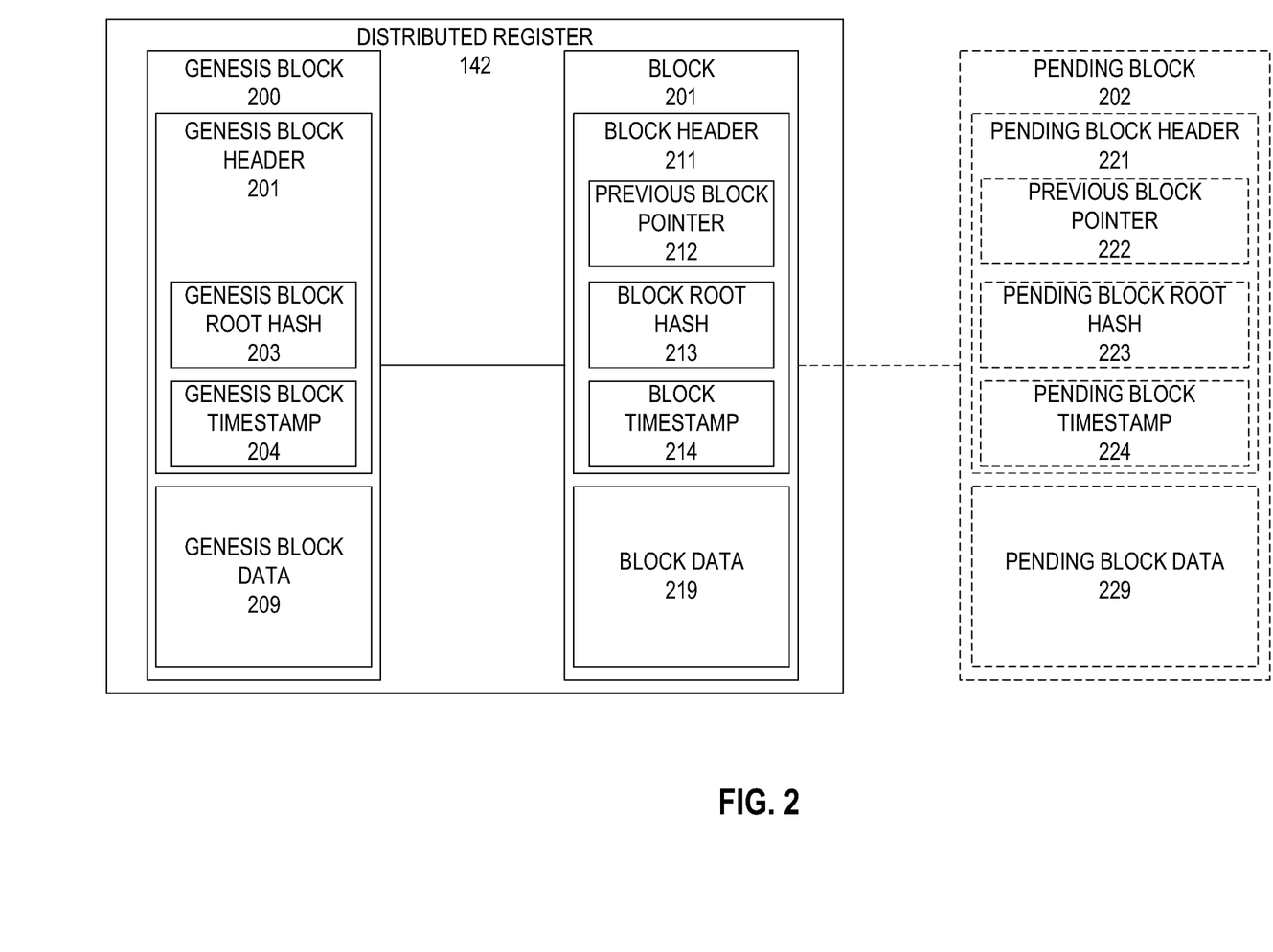
FIG. 2 is a block diagram illustrating the data structures within an exemplary distributed register, in accordance with one embodiment of the present disclosure.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents, or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Figure 3:
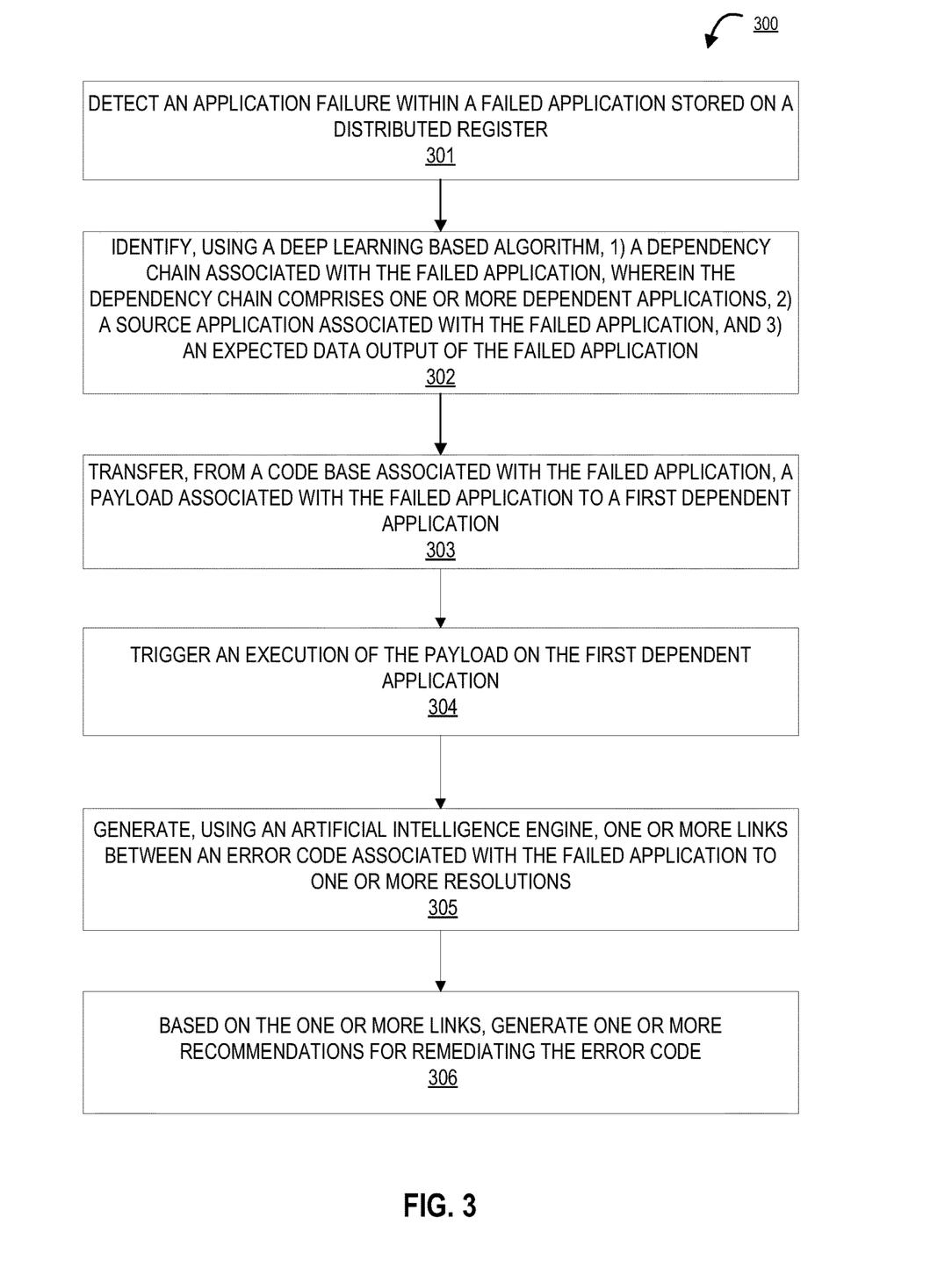
FIG. 3 is a flow diagram illustrating a process for performing remediation of application failure, in accordance with one embodiment of the present disclosure.

FIG. 3 is a flow diagram illustrating a process for performing remediation of application failure, in accordance with one embodiment of the present disclosure. The process begins at block 301, where the system detects an application failure within a failed application stored on a distributed register. An application failure may disrupt any workflows that depend from the failed application. In this regard, the application failure may include events such as an operating system issue (e.g., older libraries are not compatible with the new operating system version), code or logical processing related issues (e.g., the failed application has become stuck or frozen), hardware related issues (e.g., the host system of the failed application is experiencing a hardware failure), network related issues (e.g., network congestion or latency), data format issues (e.g., the data to be processed contains characters in an incompatible format), or the like. The system may detect the application failures by continuously monitoring the system logs associated with the failed application stored on the distributed register.

In some embodiments, the system may, using a code fix applicator, attempt to automatically deploy a fix from the failure and resolutions database, which may include certain resolutions for errors as detailed in the system log. For instance, the failure and resolutions database may store a script for updating a device driver, libraries, or the like. Accordingly, if the system detects that the error as seen in the system log corresponds to the fix (e.g., the script), the system may attempt to apply the fix (e.g., run the script) to resolve the issue. If the issue is unable to be resolved using the code fix applicator, the system may move on to the next step.

The process continues to block 302, where the system identifies, using a deep learning based algorithm, 1) a dependency chain associated with the failed application, wherein the dependency chain comprises one or more dependent applications, 2) a source application associated with the failed application, and 3) an expected data output of the failed application. In an exemplary embodiment, the failed application may be associated with one or more dependent applications (e.g., a first application and/or a second application) which depend on outputs from the failed application in a particular workflow. Further, the failed application may itself depend on outputs from an application (e.g., the source application) to serve as inputs into the processes run by the failed application. This information may be stored on the distributed register such that all applications stored on the distributed register may be able to view and access the information.

The process continues to block 303, where the system transfers, from a code base associated with the failed application, a payload associated with the failed application to a first dependent application. In this regard, the system may cause the first dependent application to access the code base associated with the failed application, which is stored on the distributed register. Based on the code base of the failed application, the first dependent application may identify all of the applications in the dependency chain, the source application from which to receive the input data, the operations or processes to perform on such data, and the type of output to be produced by the operations or processes. In other words, the first dependent application may have access to all of the information needed to execute the payload on behalf of the failed application.

The process continues to block 304, where the system triggers an execution of the payload on the first dependent application. In this regard, the first dependent application may receive the input data from the source application, execute one or more operations or processes on the input data according to the code base of the failed application, and output the processed data to the next application in the dependency chain (e.g., the second dependent application). In this way, the system may provide a way to efficiently redirect workflows to ensure that application failures do not disrupt the workflow processes.

In some embodiments, the system may perform processing load balancing of redirected workflows based on available computing resources of the dependent applications. For instance, if the system that hosts the first dependent application has a higher amount of processing power available to execute the payload in comparison to the host of the second dependent application, the system may select the first dependent application on such a basis.

The process continues to block 305, where the system generates, using an artificial intelligence engine, one or more links between an error code associated with the failed application to one or more resolutions. The system may access code repositories to identify failures related to or similar to the failure experienced by the failed application, as well as perform affinity detection with the history of failures across applications stored within the distributed register. The engine may further retrieve the error code from the system log associated with the failed application and query one or more databases or search engines for potential resolutions related to the error code. In this regard, the system may use NLP to parse resources such as articles, forum posts, webpages, or the like to identify the potential resolutions. If no potential resolution is found, the system may generate a report (which indicates that no potential resolution was found) to be appended to the distributed register.

The process concludes at block 306, where the system, based on the one or more links, generates one or more recommendations for remediating the error code. The one or more recommendations may be submitted to be appended to the distributed register. In some embodiments, the system may automatically attempt to apply the one or more potential resolutions to remediate the error code. If the system is able to fix the error code, the system may append a report to the distributed register indicating that the potential resolution has successfully remediated the failure or error code. On the other hand, if the potential resolutions are unsuccessful in remediating the failure, the system may append a report to the distributed register indicating that the potential resolution has failed to remediate the failure or error code. The system may further transmit notifications to one or more users (e.g., administrators of the entity), where the notification indicates that the potential resolution steps have failed and that further action is needed. In this way, the system may efficiently maintain workflow processes within the enterprise network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for code base sharing during computing application failure using a distributed register network, the system comprising:
   a memory device with computer-readable program code stored thereon;
   a communication device; and
   a processing device operatively coupled to the memory device and the communication device, wherein the processing device is configured to execute the computer-readable program code to:
      detect an application failure within a failed application stored on a distributed register;
      identify, using a deep learning based algorithm:
         1) a dependency chain associated with the failed application, wherein the dependency chain comprises one or more dependent applications;
         2) a source application associated with the failed application; and
         3) an expected data output of the failed application;
      transfer, from a code base associated with the failed application, a payload associated with the failed application to a first dependent application;
      trigger an execution of the payload by the first dependent application;
      generate, using an artificial intelligence engine, one or more links between an error code associated with the failed application to one or more resolutions; and
      based on the one or more links, generate one or more recommendations for remediating the error code.

2. The system according to claim 1, wherein triggering the execution of the payload comprises causing the first dependent application to:
   retrieve input data from the source application;
   perform one or more processes on the input data based on the code base associated with the failed application; and
   transmit the expected data output of the failed application to a second dependent application based on the dependency chain associated with the failed application.

3. The system according to claim 1, wherein triggering the execution of the payload comprises selecting the first dependent application based on computing resource availability of a host computing system associated with the first dependent application, wherein the computing resource availability comprises at least one of processing power, memory space, and network bandwidth.

4. The system according to claim 1, wherein detecting the application failure comprises retrieving an error code within a system log associated with the failed application, wherein the system log is stored in the distributed register.

5. The system according to claim 1, wherein the application failure comprises one of an operating system failure, processing failure, or data failure.

6. The system according to claim 1, wherein the processing device is further configured to execute the computer-readable program code to:
   automatically execute the one or more resolutions;
   detect that the one or more resolutions have remediated the error code; and
   append an indication of successful remediation to the distributed register.

7. The system according to claim 1, wherein the processing device is further configured to execute the computer-readable program code to:
   automatically execute the one or more resolutions;
   detect that the one or more resolutions have not remediated the error code; and
   append an indication of failed remediation to the distributed register.

8. A computer program product for code base sharing during computing application failure using a distributed register network, the computer program product comprising at least one non-transitory computer readable medium having computer-readable program code portions embodied therein, the computer-readable program code portions comprising executable portions for:
   detecting an application failure within a failed application stored on a distributed register;
   identifying, using a deep learning based algorithm:
      1) a dependency chain associated with the failed application, wherein the dependency chain comprises one or more dependent applications;
      2) a source application associated with the failed application; and
      3) an expected data output of the failed application;
   transferring, from a code base associated with the failed application, a payload associated with the failed application to a first dependent application;
   triggering an execution of the payload by the first dependent application;
   generating, using an artificial intelligence engine, one or more links between an error code associated with the failed application to one or more resolutions; and
   based on the one or more links, generating one or more recommendations for remediating the error code.

9. The computer program product of claim 8, wherein triggering the execution of the payload comprises causing the first dependent application to:
   retrieve input data from the source application;
   perform one or more processes on the input data based on the code base associated with the failed application; and
   transmit the expected data output of the failed application to a second dependent application based on the dependency chain associated with the failed application.

10. The computer program product of claim 8, wherein triggering the execution of the payload comprises selecting the first dependent application based on computing resource availability of a host computing system associated with the first dependent application, wherein the computing resource availability comprises at least one of processing power, memory space, and network bandwidth.

11. The computer program product of claim 8, wherein detecting the application failure comprises retrieving an error code within a system log associated with the failed application, wherein the system log is stored in the distributed register.

12. The computer program product of claim 8, wherein the application failure comprises one of an operating system failure, processing failure, or data failure.

13. The computer program product of claim 8, wherein the computer-readable program code portions further comprise executable portions for:
   automatically executing the one or more resolutions;
   detecting that the one or more resolutions have remediated the error code; and
   appending an indication of successful remediation to the distributed register.

14. A computer-implemented method for code base sharing during computing application failure using a distributed register network, the computer-implemented method comprising:
    detecting an application failure within a failed application stored on a distributed register;
    identifying, using a deep learning based algorithm:
        1) a dependency chain associated with the failed application, wherein the dependency chain comprises one or more dependent applications;
        2) a source application associated with the failed application; and
        3) an expected data output of the failed application;
    transferring, from a code base associated with the failed application, a payload associated with the failed application to a first dependent application;
    triggering an execution of the payload by the first dependent application;
    generating, using an artificial intelligence engine, one or more links between an error code associated with the failed application to one or more resolutions; and
    based on the one or more links, generating one or more recommendations for remediating the error code.

15. The computer-implemented method of claim 14, wherein triggering the execution of the payload comprises causing the first dependent application to:
    retrieve input data from the source application;
    perform one or more processes on the input data based on the code base associated with the failed application; and
    transmit the expected data output of the failed application to a second dependent application based on the dependency chain associated with the failed application.

16. The computer-implemented method of claim 14, wherein triggering the execution of the payload comprises selecting the first dependent application based on computing resource availability of a host computing system associated with the first dependent application, wherein the computing resource availability comprises at least one of processing power, memory space, and network bandwidth.

17. The computer-implemented method of claim 14, wherein detecting the application failure comprises retrieving an error code within a system log associated with the failed application, wherein the system log is stored in the distributed register.

18. The computer-implemented method of claim 14, wherein the application failure comprises one of an operating system failure, processing failure, or data failure.

19. The computer-implemented method of claim 14, wherein the computer-implemented method further comprises:
    automatically executing the one or more resolutions;
    detecting that the one or more resolutions have remediated the error code; and
    appending an indication of successful remediation to the distributed register.

20. The computer-implemented method of claim 14, wherein the computer-implemented method further comprises:
    automatically executing the one or more resolutions;
    detecting that the one or more resolutions have not remediated the error code; and
    appending an indication of failed remediation to the distributed register.

* * * * *